United States Patent
Bader

[15] 3,682,199
[45] Aug. 8, 1972

[54] PNEUMATIC DIFFERENTIAL PRESSURE AMPLIFIER

[72] Inventor: Horst Bader, Stuttgart-Fasanenhof, Germany

[73] Assignee: J. C. Eckardt AG., Stuttgard, Germany

[22] Filed: Oct. 28, 1970

[21] Appl. No.: 84,630

[30] Foreign Application Priority Data

Nov. 3, 1969 Germany..........P 19 55 083.5

[52] U.S. Cl........137/625.48, 137/81.5, 235/201 ME
[51] Int. Cl..........F16k 11/02, F15c 3/04, F15c 3/06
[58] Field of Search...........137/625.47, 625.48, 81.5; 235/201 ME

[56] References Cited

UNITED STATES PATENTS

| | | |
|---|---|---|
| 3,384,122 | 5/1968 | Harpman...................251/367 |
| 3,227,180 | 1/1966 | Tissot-Dupont........251/367 X |
| 3,311,301 | 3/1967 | Chabrier et al.....235/201 ME |
| 3,319,885 | 5/1967 | Eige....................235/201 ME |
| 3,326,239 | 6/1967 | Saint-Joanis et al............235/201 ME |
| 3,335,950 | 8/1967 | Tal et al..............235/201 ME |
| 3,362,633 | 1/1968 | Freeman............235/201 ME |

Primary Examiner—Samuel Scott
Attorney—Craig, Antonelli, Stewart & Hill

[57] ABSTRACT

A differential amplifier in which two balls of the same diameter are displaceable in a housing bore and control at least one outlet channel, whereby the supply channel for compressed air is disposed in the housing substantial in line with the point of contact between the two balls when the difference in pressure is zero, and at a distance from the outlet channel equal to half the diameter of a ball.

8 Claims, 5 Drawing Figures

Patented Aug. 8, 1972

3,682,199

INVENTOR

HORST BADER

BY Craig, Antonelli, Stewart & Hill

ATTORNEYS

PNEUMATIC DIFFERENTIAL PRESSURE AMPLIFIER

The invention relates to a pneumatic differential pressure amplifier consisting of two resilient walls (diaphragms, spring bellows, capsule springs) which unilaterally bound two input pressure chambers and serve as an adjusting arrangement for the adjustment of balls which control the inlet and outlet of compressed air. Prior art differential pressure amplifiers generally have two pressure bellows which act on a lever system, the movement of which, dependent upon the difference between the pressures in the bellows, is used to modulate a system of nozzle plates. Differential pressure amplifiers of this type require a certain amount of space which must be regarded as an absolute minimum. In addition, they are relatively involved and costly and do not permit of a compact construction. Furthermore, a power amplifier must generally be disposed downstream of the prior art differential pressure amplifiers, since the nozzle plate system can only provide a relatively small quantity of air.

Furthermore, a construction of differential pressure amplifiers is know in which four balls are necessary to control the inlet and outlet of pressurized medium, as well as bores of different diameter. In this case, two balls are displaceable in one control bore, the length of which must be accurately observed if reversing errors are to be avoided or kept to the minimum. In addition, the distance between these control bores must also be made with a small tolerance. This signifies considerable complication and expenditures in the manufacture of these known differential pressure amplifiers. By virtue of the manner in which these amplifiers operate, two balls in each case leave their control bore and are no longer laterally guided. This has an adverse effect on the functional reliability and gives rise to properties which depend on the position of the amplifier.

The present invention is based on the problem of avoiding these disadvantages and of providing a differential pressure amplifier which can be manufactured and constructed easily and space-savingly and the sensitivity of which can be increased as compared with known differential pressure amplifiers. In the case of differential pressure amplifiers of the type mentioned hereinabove, the present invention essentially resides in that the resilient walls are in operative communication with two balls of the same diameter disposed for displacement in a bore in the casing of the amplifier and of constant diameter disposed for displacement in a bore in the casing of the amplifier and of constant diameter, and in that a compressed air supply duct is disposed in line with the point of contact of the balls, and in that at least one outlet duct is provided which discharges into the bore at a distance of half the diameter of the ball from the supply duct.

The present invention makes it possible to dispense with lever systems. The movement of the diaphragms or bellows is used directly to move two balls, at least one of which more or less opens or closes an outlet duct. The sensitivity and degree of amplification of the amplifier is increased if two balls serve as throttle members which control the outflow of compressed air into one respective outflow duct each.

It is envisaged that the balls bear on or abut against each other and that the supply duct for the pressure medium is located approximately in line with the point of contact between the balls. With such a construction, each ball with its corresponding outlet duct acts as a variable throttle resistance, and more particularly in the reverse direction to one another, i.e., when one ball opens up its outlet duct and enables the discharge of pressure medium, then the other ball at the same time closes to an ever increasing degree the outflow duct which is associated with it. The outlet signal in the first outlet duct therefore rises while the outlet signal in the second outlet duct drops. By choosing the same cross-sections, it is possible to ensure that the pressure in one outlet duct drops to the same extent as it rises in the other outlet duct so that, when the difference between output signals is measured in the output of the differential pressure amplifier, a doubling of the amplification factor is in theory attainable.

The differential pressure amplifier according to the invention represents a space-saving and operationally reliable construction. During operation, only two balls are displaced and guided in a bore of constant diameter. The length of this bore is not subject to any close tolerances. Only the spacing between the outlet ducts and the air supply duct must be respected. It offers no notable difficulty to observe and control these dimensions.

In order to achieve the same flow conditions at the throttle stations, it is envisaged that the balls be of the same diameter and be guided in a common bore, whereby for structural reasons a bore in a cylinder inserted into a housing is appropriately provided to guide the balls which is slotted laterally to increase the outflow duct cross-section. For each outlet duct, the cylinder may also be horizontally slotted at both ends and may be provided, for the supply of pressure medium, with a bore extending at right-angles to the outlet duct connections adjoining the slots.

The sensitivity and air output of the differential pressure amplifier can be enhanced by this measure. Small reciprocating movements of the still laterally guided throttle members (balls) will produce a greater change in the outflow cross-sections.

Since the cylindrical piece can be machined before it is inserted into the housing, it can be manufactured without difficulty. Naturally, it is also possible to provide for both outlet ducts different throttling curves or throttle cams if this should be desired.

The invention will be explained in greater detail hereinafter with reference to some embodiments illustrated in the attached drawings, in which.

Figure 1:
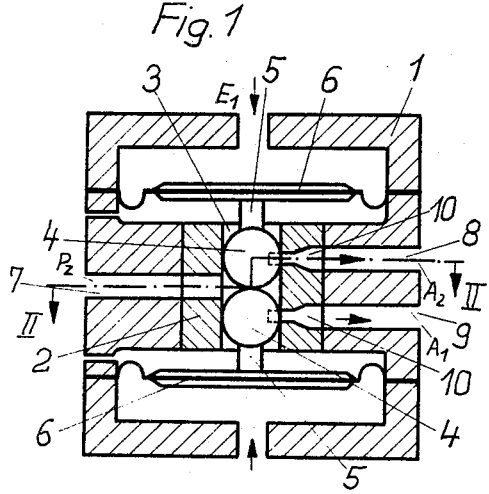
FIG. 1 is an axial cross-section through a schematically illustrated exemplary embodiment of a differential pressure amplifier according to the present invention.

According to the invention, a pneumatic differential pressure amplifier comprises two resilient walls each of which forms one wall of an input pressure chamber and serves as an adjusting arrangement for an adjusting ball valve, each of which controls the inlet and outlet of compressed air into and out of an outlet duct, wherein the resilient walls are each in operative communication with one of two balls of the same diameter disposed to be displaceable in a bore of constant diameter in the housing of the amplifier, a compressed-air supply duct is aligned tangentially aligned with the point of contact of the balls 4 in this position, there is provided in the cylinder 2 and in the adjacent housing 1 a bore 7, through which compressed air is supplied at the supply pressure $p_z$. Also contained in the housing 1 are two further outlet bores 8 and 9, at which the output signals $A_2$ and $A_1$ can be detected and measured. The bores 8 and 9 start with conically constructed slots 10 in the cylinder 2 which serve to increase the outlet cross-section for the compressed air upon movement of the balls 4, so that a high degree of sensitivity and air output can be achieved.

Figure 3:
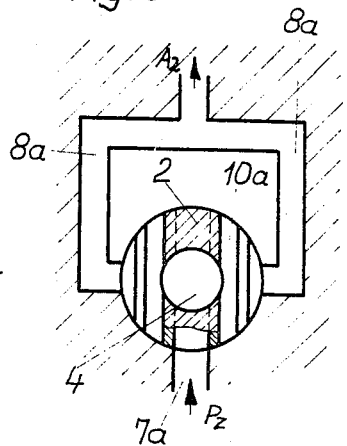
FIG. 3 is a cross-section, similar to FIG. 2, of a second embodiment of a pressure amplifier according to the invention.
Figure 2:
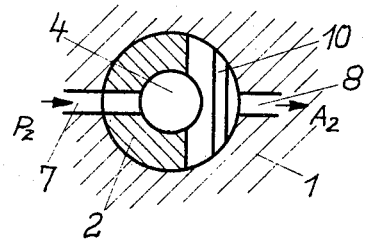
FIG. 2 is a cross-section taken along the line II—II in FIG. 1, looking in the direction of the arrows.

In order further to increase the outlet cross-section and therewith to improve the flow conditions and enhance the sensitivity, it is also possible, according to FIG. 3 to provide for each output signal a double pick-up by means of the arms 8a at the cylinder 2 provided on both sides with slots 10a. In this case, the pressurized medium $p_z$ must be supplied through the bore 7a approximately at right-angle to the end of the arms 8a. FIG. 3 shows the arrangement for the output signal $A_2$; the construction for the output signal $A_1$ is similar but as in FIG. 1 staggered in height in respect of the output ducts for the signal $A_2$.

Figure 4:
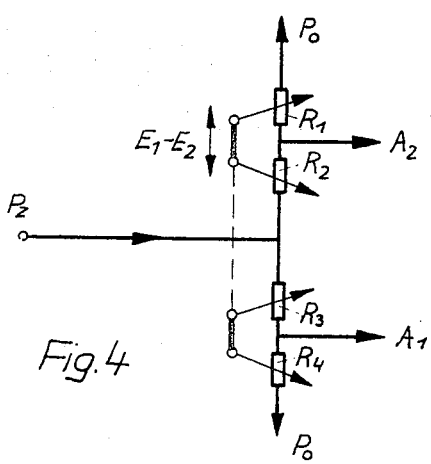
FIG. 4 is a diagrammatic view of the novel differential pressure amplifier to explain its mode of operation.

FIG. 4 shows diagrammatically that the novel, differential pressure amplifier is essentially to be regarded as a pressure divider arrangement with variable resistances $R_1$ and $R_4$ which are adjusted simultaneously but in opposite directions by the difference between the input signals $E_1$ and $E_2$. The output signal $A_2$ is measured between the resistances $R_1$ and $R_2$ and the output signal $A_1$ is measured between the resistances $R_3$ and $R_4$.

Figure 5:
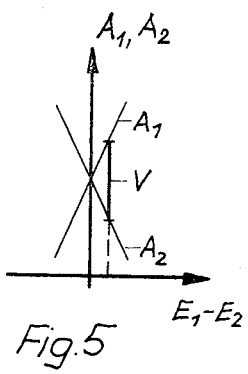
FIG. 5 is a diagram showing the pattern of the two output signals of the novel amplifier as a function of the differential pressure acting on the amplifier.

The qualitative progress of the pressure of output signals $A_1$ and $A_2$ as a function of the difference between input signals $E_1$ and $E_2$ is shown in FIG. 5. It is clear that with increasing differential pressure, i.e., when the pressure $E_1$ becomes greater than the pressure $E_2$, the balls 4 are displaced downwardly by means of the diaphragm 6. As a result thereof, the lower ball exposes or opens up to an ever increasing extent the outflow cross-section to the duct 9, while the upper ball 4 increasingly closes the outflow cross-section in the duct 8. The output signal $A_1$ therefore changes in the same direction as the input signal $E_1$ and therefore rises (FIG. 5), while the output signal $A_2$ in the exemplary embodiment selected, in which the dimensions and hence also the resistance conditions are chosen to be of identical magnitude, decreases in the same sense. FIG. 5 shows that, when the difference between output signals $A_1$ and $A_2$ is measured, the input difference ($E_1 - E_2$) is amplified by the factor V.

The present invention provides for a type of construction extremely easily manufactured for a differential pressure amplifier which, above all by reason of the small amount of space actually required, opens up new possibilities of application for pneumatic differential pressure amplifiers.

While I have shown or described several embodiments of the present invention, it is understood that the same is not limited thereto but is susceptible of numerous changes and modifications as known to those skilled in the art, and I therefore do not wish to be limited to these details but intend to cover all such changes and modifications as are encompassed by the scope of the appended claims.

What I claim is:

1. A differential pressure amplifier with a housing and with two resilient walls delimiting two input pressure chambers on one side and serving as adjusting means for an adjusting ball valve means controlling the inlet and outlet of compressed air into and out of at least one outlet channel, characterized in that the resilient walls are operatively connected with two balls substantially of the same diameter displaceably arranged in a bore provided in the housing of the amplifier, said two balls being adapted to contact each other within the bore, and in that a supply channel for the compressed air is disposed substantially tangentially aligned with the point of contact of the balls with each other within the bore, at least one outlet channel being provided which terminates in the bore substantially at a distance of half the diameter of a ball of the ball valve means from the supply channel.

2. A differential pressures amplifier according to claim 1, characterized in that the bore for the balls is of substantially constant diameter.

3. A differential pressure amplifier according to claim 1, characterized in that the two balls abut against each other and are acted upon at the opposite sides thereof by the differential pressures.

4. A differential pressure amplifier according to claim 1, characterized in that a center line of the supply channel is disposed substantially tangentially aligned with the point of contact of the balls, and that a center line of the at least one outlet channel is arranged at substantially the distance of half the diameter of the ball of the ball valve means from the center line of the supply channel.

5. A differential pressure amplifier according to claim 1, characterized in that the balls of the ball valve means are disposed in a cylinder inserted into a bore of the housing, said cylinder being provided with lateral slots of increasing cross section in the direction of the outflow.

6. A differential pressure amplifier according to claim 5, characterized in that the cylinder for one outlet channel is provided at both sides with horizontal slots and in that the supply channel is disposed at right angle to a center line through the outlet channels at their point of communication with the horizontal slots.

7. A differential pressure amplifier according to claim 6, characterized in that the bore for the balls is of substantially constant diameter.

8. A differential pressure amplifier according to claim 7, characterized in that the two balls abut against each other and are acted upon at the opposite sides thereof by the differential pressures.

* * * * *